July 21, 1964 R. W. MOORE 3,141,264
BLASTING WITH ABRASIVE PARTICLES
Filed March 25, 1963 8 Sheets-Sheet 3

INVENTOR
RALPH W MOORE
BY Connolly and Hutz
ATTORNEYS

July 21, 1964   R. W. MOORE   3,141,264
BLASTING WITH ABRASIVE PARTICLES
Filed March 25, 1963   8 Sheets-Sheet 5

INVENTOR
*RALPH W. MOORE*
BY *Connolly and Hutz*
ATTORNEYS

INVENTOR
RALPH W MOORE

United States Patent Office 3,141,264
Patented July 21, 1964

3,141,264
BLASTING WITH ABRASIVE PARTICLES
Ralph W. Moore, Hagerstown, Md., assignor to The Pangborn Corporation, Hagerstown, Md., a corporation of Delaware
Filed Mar. 25, 1963, Ser. No. 267,864
9 Claims. (Cl. 51—12)

The present invention is a continuation in part of patent application S.N. 188,744, filed April 19, 1962, now Patent No. 3,089,285, granted May 14, 1963, and relates to the blasting of work pieces with abrasive particles carried by a stream of fluid. More specifically, it relates to apparatus for supplying and cutting off the flow of abrasive particles.

In the abrasive cleaning field, particularly the pressure blasting art, the maintenance of a shutoff or regulatory valving system is often found to be a source of considerable inconvenience and expense, and very few arrangements have been found which work consistently or well. Because of the nature of a stream of moving abrasive or blastant particles, the life of the usual regulating valve is generally very short. This is due to the fact that a moving abrasive tends to cut and scour the parts or to sift into and across valve seats and fittings causing added wear.

Various devices and techniques have been employed to lengthen the life and increase the reliability of abrasive regulatory devices. To date, however, the results have not been completely successful.

It is an object of the present invention to provide a different type of valve arrangement than shown in the above application 188,744 for controlling the feed of abrasive held under pressure. Also, an object of the invention is to provide an air-abrasive mixing chamber which can be vented.

The above and other objects are accomplished in accordance with the present invention by a supply apparatus that includes a valve structure having a spherical resilient valve seat which serves to control the abrasive flow normally leading into the air-abrasive mixing chamber. The spherical resilient unit was found more satisfactory than the flat rubber piece valve seat used in the parent application.

A better understanding of the invention will be gained by referring to the appended drawings wherein.

Figure 1:
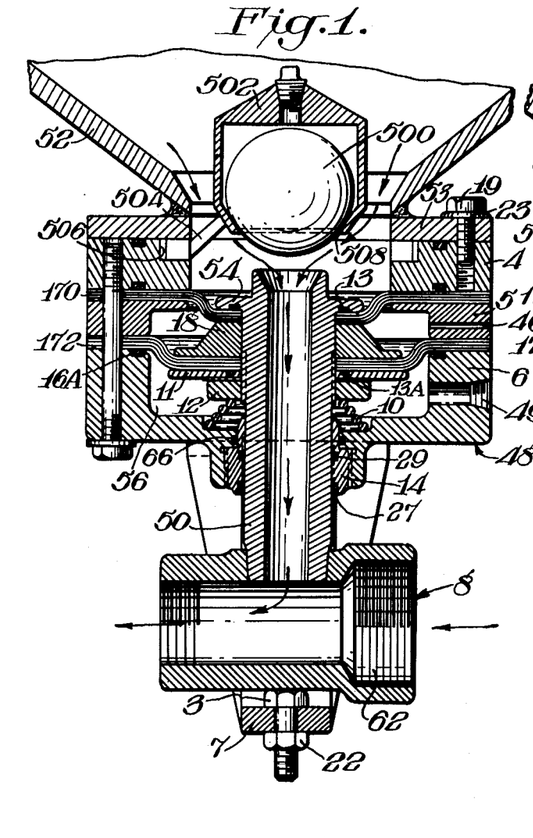
FIG. 1 is a vertical cross section of a valving arrangement of the present invention shown in open position.
Figure 2:
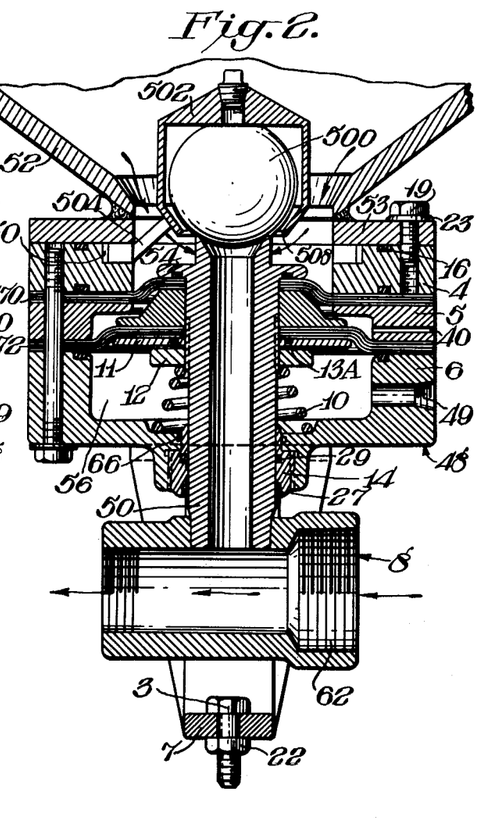
FIG. 2 is section similar to FIG. 1 with the valve in closed position.
Figure 3:
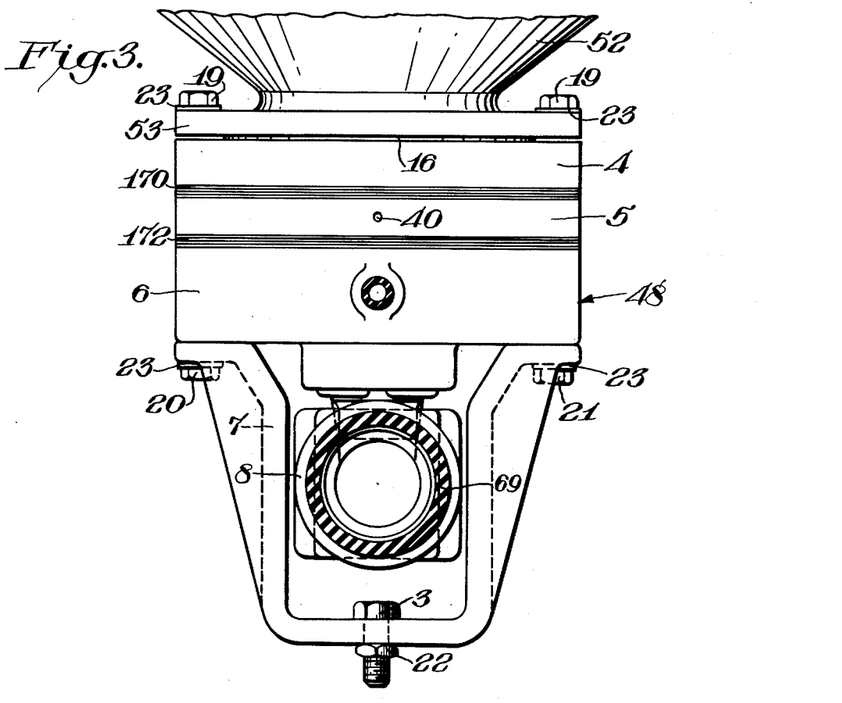
FIG. 3 is a side view of the arrangement of FIGS. 1 and 2.

The supply structure of FIGS. 1-3 comprises a pressurized tank, the lower portion of which is shown at 52, in sealed attachment as by welded-on flange 53 and O-ring 16, to the body of valving device 48 with a set of cap screws 19 and washers 23. The valving device 48 has a top plate 4, an intermediate ring 5, a lower cup 6, and a U-shaped bracket 7, held together by bolts 20 and 21. In the space between the arms of bracket 7 there is a mixing T 8 that includes a horizontal tube 62 and a vertical tube valve 50, which is vertically slidable with respect to the floor of cup 6. A gland nut 14, containing scraper ring 29 and cylindrical guide 27, is pressed or threaded into the floor of cups 6, and provides a seal against the movable stem. The gland nut is, in turn, sealed against the cup floor by an O-ring 66 or similar gasket. A screw 3 adjustably threaded in the web of bracket 7 and locked in place by a nut 22, provides a stop for the downward travel of the mixing T. Flexible diaphragms 170 and 172 connected between stem 50 and the outer walls of the valving device seal the upper portion of its hollow interior. A head 54 and spacers 18 and 11 are clamped to the central portions of the diaphragms by nut 12 and secured to the stem 50. The outer portions of the diaphragms are clamped between the plate 4 and ring 5, and between ring 5 and cup 6 respectively. Inner O-rings 13 and 13A and outer O-rings 16 and 16A also help seal the diaphragm in place.

Mixing T 8 and vertical valve 50 are biased upwardly by compression spring 10 against a resilient spherical ball-type valve shut-off 500 supported loosely in housing 502 which is supported by arm 504 in a slot 506 formed in top plate 4 as shown. The housing 502 has a bottom opening 508 through which the peripheral portion of the ball 500 extends. When the valve is in closed position (see FIG. 2) the ball 500 is compressed as shown. Here the abrasive passes down around the housing and into the mouth of tube 50. The spring 10 is shown as disposed between clamp nut 12 and the floor of cup 6 in a chamber 56 in the lower portion of the interior of the valving device 48, although the spring can be external of the chamber, if desired. A control port 49 in the side wall of cup 6 enables the connection of a control line for fluid that can be introduced into or released from chamber 56 to effect operation of the valve. The horizontal tube 62 of the mixing T 8 can then be connected to a line that discharges a stream of fluid, so as to cause the stream to entrain the partciles that are delivered from tank 52 through the valving device. An external breathing port 40 can also be provided for the space between the two diaphragms, but this is not essential.

Operation of the valving device of FIGS. 1 and 2 is effected by connecting an abrasive reservoir or tank 52 and the tube 62 to the same source of pressurized fluid, e.g. compressed air. An arrangement such as illustrated will be explained later.

Figure 4:
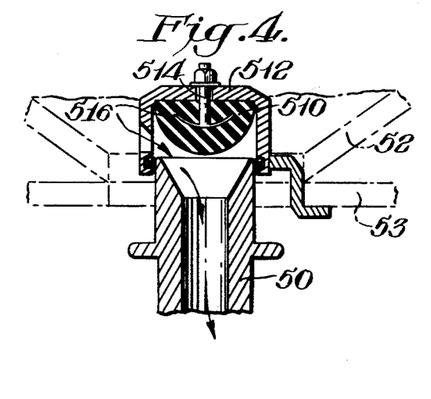
FIG. 4 is a broken section of an embodiment of the valve arrangement of FIGS. 1 and 2 showing the valve in open position.
Figure 5:
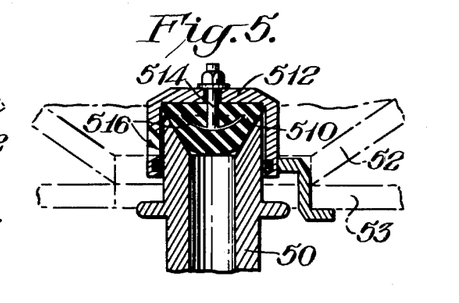
FIG. 5 is similar to FIG. 4 showing the valve arrangement in closed position.

FIGS. 4 and 5 show, in open and closed position respectively, a modification of the ball-type valve of FIGS. 1 and 2 whereby a semi-spherical shaped or half-ball 510 is used. The half-ball 510 is supported in housing 512 by bolt and nut assembly 514 with the bolt body being embedded in the ball. Curved flange 516 on the lower end of the bolt prevents the ball from slipping off the bolt. The housing 512 is supported in a manner similar to that described with reference to FIGS. 1 and 2.

Figure 6:
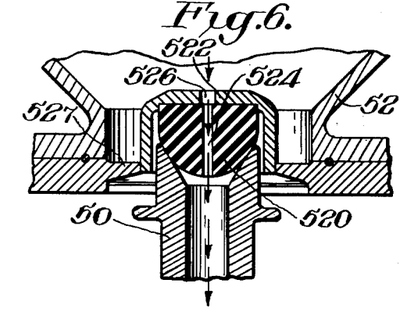
FIG. 6 is a broken section of still a further embodiment of the valving arrangement of the present invention showing the valve in open position.
Figure 7:
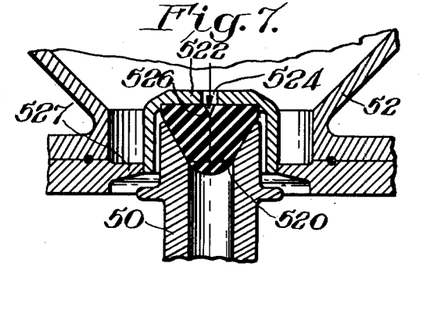
FIG. 7 is a section similar to that of FIG. 6 with the valve in closed position.

FIGS. 6 and 7 show still another form of ball-type valve which can be used. Here a semi-spherical shaped ball 520 is supported in housing 522 which has a central abrasive feed opening 524 in the roof thereof. Here, there is a central vertical passageway 526 extending completely through the ball 520. Abrasive is prevented from passing down around the housing periphery by the continuous rim support 527 for the housing 522. With this embodiment, the vertically slidable tube 50 is always in contact with the ball 520 and when the tube 50 is in its upward or closed position, it compresses the ball to close off the passageway 526. When the tube is moved down to open position, it releases sufficient compression on the ball to permit the passageway to open to allow abrasive to pass through from the supply maintained directly above said passageway. This embodiment is preferably used with abrasive of less than 60 mesh. Past experience has proved that very fine abrasive, with their very indefinite repose angle can be metered at a uniform rate only through a vertical hole having complete access to the abrasive charge.

Figure 8:
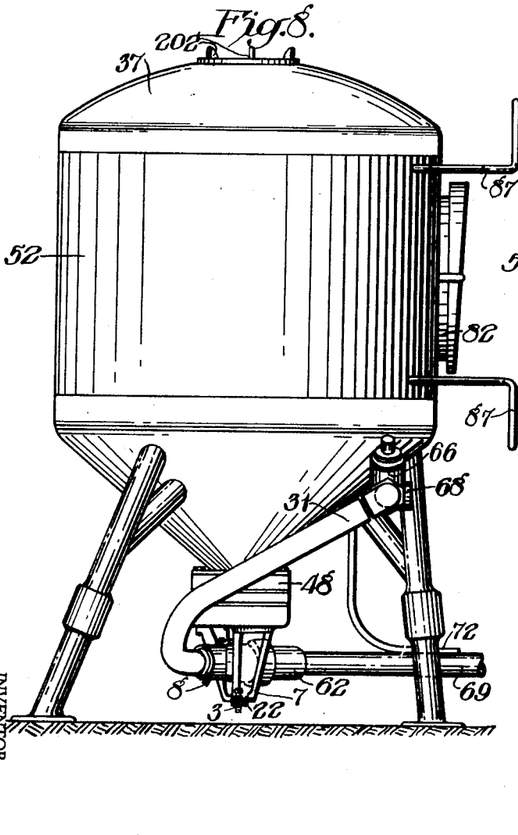
FIGS. 8 and 9 are front and side views respectively of the valving devices of the above figures incorporated with the abrasive supply tank and the air feed and air pressure control system.
Figure 9:
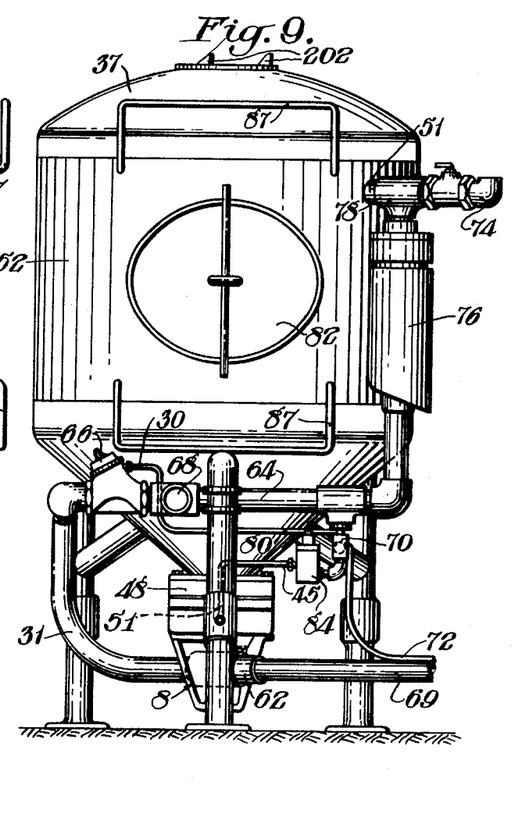

In FIGS. 8 and 9 abrasive tank 52 is shown with head 37 and filler valve guides 202. Pressurized air is obtained through receiving coupling 68 and passes into the tank through manifold 64, moisture and abrasive trap 76, tank connector T 78 and line 51. Also shown in FIGS. 8 and 9 is an externally mounted hose rack 87 for securing hose 69.

Figure 10:
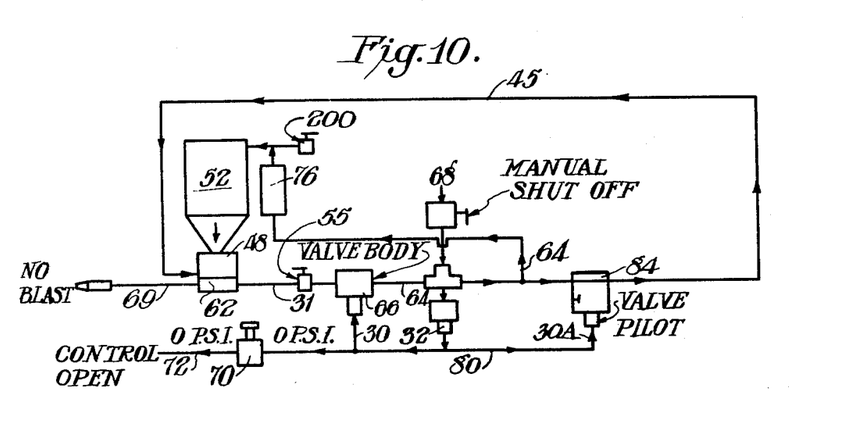
FIGS. 10 and 11 are views of the pressure holding regulatory system of the type employed in FIGS. 1-4 in the off and on position, respectively.
Figure 11:
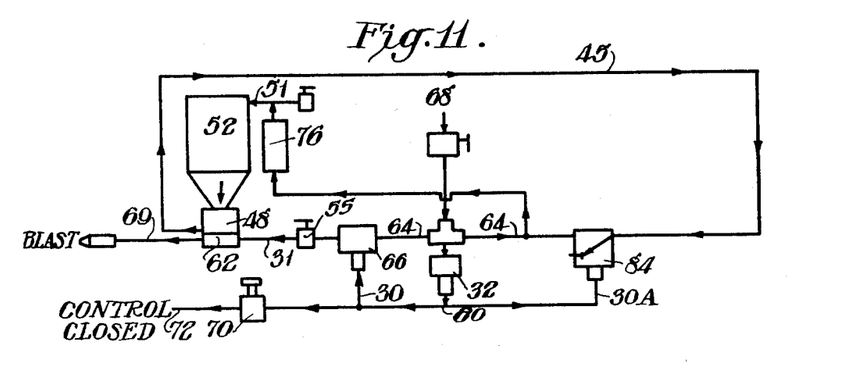

The arrangement illustrated in the above figures comprises a pressure tank 52 operating independently of the control of the pressure blasting stream (also see FIGS. 10 and 11). Main valve 66 controls the flow of the pressurized air from manifold 64 to line 31, horizontal mixing T 62 and into the blast discharge line 69. Manifold 64 also separately supplies air through filter restrictor 32, line 80 and pressure reducer 70 to remote control line 72. At the same time, pressurized air is connected through 3-way control valve 84 and line 45 to valving device 48 to maintain tube 50 in seated position against the ball valve seat against the pressure of tank 52. Extension control line 30 controls the operation of valve 66 which is biased in a closed position and opens in response to an increase in pressure in line 80 obtained by blockage of remote control line 72.

When the device is to be turned on (FIG. 11) control line 72 is blocked, allowing pressure to build up in lines 80, 30 and 30A, tripping 3-way valve 84 to vent line 45 to the atmosphere and opening valve 66. As a result, the pressure in pressurized tank 52 acts on diaphragm 170 opening valve 48, while full pressure is simultaneously flowing through line 31 into mixing T 8. At T 8 the vehicle and abrasive are admixed and proceed to the nozzle. If desired, a manually operated choke relief valve 55 can be inserted between valve 66 and valving device 48 so that substantially full pressure may be supplied from manifold 64 to tank 52 for the purpose of clearing any blockage in the valving device. If desired, it is also found convenient to install such a choke on a by-pass of valve 66 to allow lines 31 and 69 and the attached nozzle to be blown out with full pressure while valve 48 is in closed position.

When the operator wishes to shut off the flow of abrasive, he unblocks control line 72 causing the pressure within lines 80 and extensions 30 and 30A to drop. The reduced pressure activates 3-way valve 84 to direct pressurized air from manifold 64 through line 45 to the abrasive valve 48 to effect a seating of element 50, and also to effect a closing of valve 66 through line 30.

As employed in the present invention, the control fluid for activating valve 48 may be either a liquid or gas, and should be inert to the valve and conduit components under normal operating conditions. Air is preferred although other relatively inert gases can be used, and even water is useful, particularly where it is also the blastant propellant fluid.

In FIGS. 8 and 9 there is shown an inspection door 82 which provides access to the interior of tank 52, and a normally closed vent 74 which enables a venting of tank 52 when desired.

Figures 11A, 12:
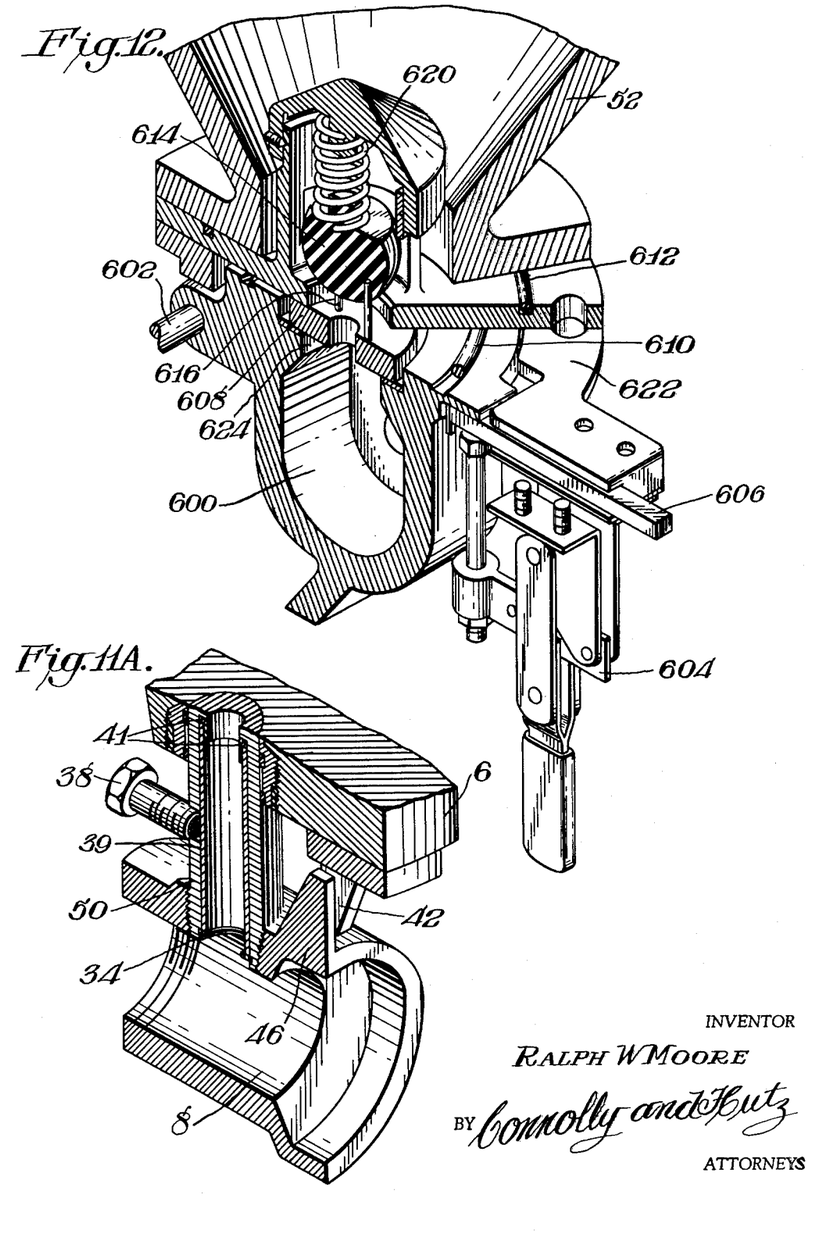
FIG. 11A is a vertical section of still another embodiment of the invention.
FIG. 12 is a section in perspective showing a pressure venting type mixing chamber with an embodiment of the valving arrangement.

In FIG. 11A is shown a useful modification of the abrasive valving device for use with the devices of the above figures in which a resilient lining or metering tube 39 is introduced into the bottom of vertical stem 50 and held in place by means of spacer 41 and retaining ring 34.

The liner is used in conjunction with an adjusting screw 38 threaded through the side of the vertical stem 50 and adapted for restricting or closing said tube. Such an arrangement is particularly useful in fine control of the rate of abrasive particle outflow into the blasting fluid, when the apparatus is in use.

A further modification includes the use of an outside guide 42 (FIG. 11A) or pair of such guides in the form of two spurs in parallel arrangement and extending downwardly from the bottom of the lower cup 6 and contacting a corresponding member 46 extending upwards from the mixing T 8. By such an arrangement the mixing T can be prevented from rotating and causing extra wear on the ball valve seat 500 while the valve is in closed position.

In the above figures the ball-type valve seats are made of tough resilient material such as vulcanized rubber (natural, chloroprene, butyl, GR–S, etc.) or plastic (polyethylene, Teflon, polyvinylchloride, etc.) or similar material which is capable of forming a good pressure seal with valving tube 50, and is resistant to wear.

The diaphragms can also be made of the above tough materials, and can be further laminated with a textile layer.

Figure 13:
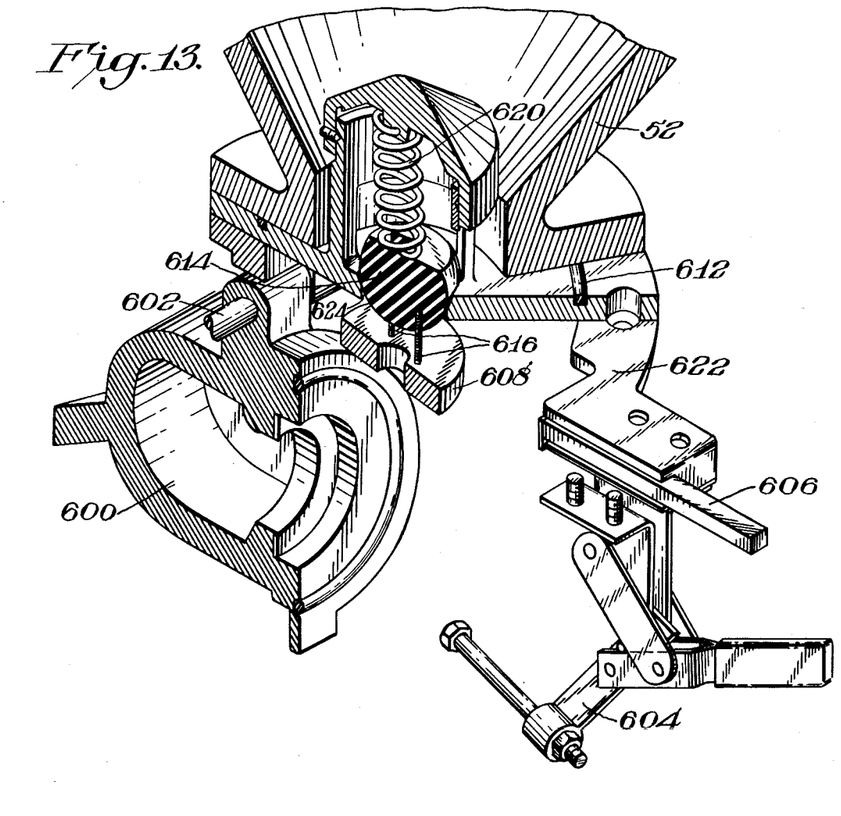
FIG. 13 is a view similar to FIG. 12 with the mixing chamber in venting position.
Figure 15:
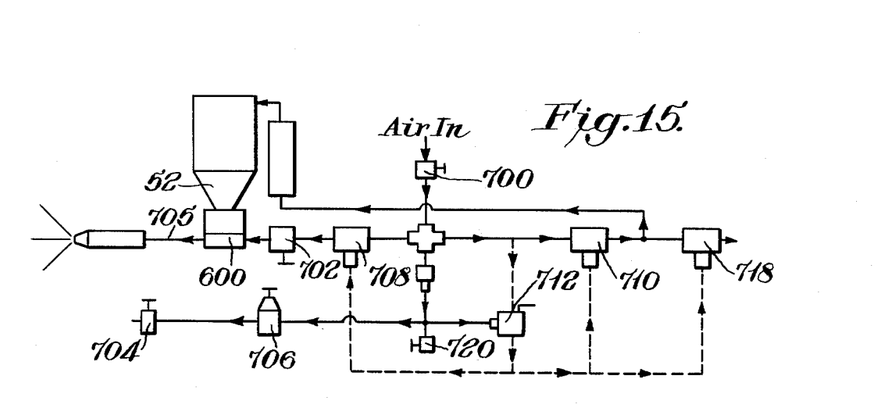
FIGS. 15 and 16 are schematic representations of the pressure venting system in the on and off positions respectively.
Figure 16:
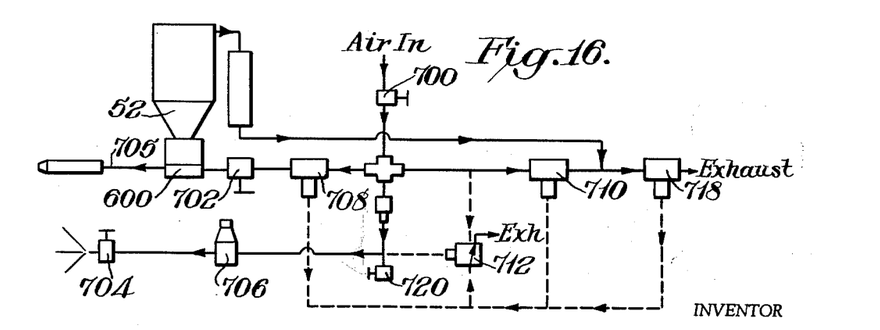

In FIGS. 12 and 13, there is shown a modification of the above type valves and mixing chamber arrangement. The arrangement of these figures is the subject of patent application S.N. 146,144, filed October 19, 1961, particularly FIG. 3 of that application. Although not claimed per se in this application, it is used in conjunction with the assembly shown in FIG. 6 of the parent application which is FIG. 14 of the present application. The air flow and air pressure system of FIGS. 15 and 16 is used with the arrangements of FIGS. 12–14.

Briefly, the valve arrangement of FIGS. 12 and 13 consists of a mixing chamber 600 which pivots around pin 602. A quick opening toggle clamp assembly 604 and a safety bar 606 hold the mixing chamber in place (FIG. 1). An orifice plate 608 is supported by a ledge of the mixing chamber and the abrasive passes through said orifice. O-ring seals 610 and 612 are provided to assure complete air-tight sealing. Check ball 614 formed of a resilient material has three depending legs 616. A compression spring 620 forces check ball 614 downwardly against the orifice plate 608. When the mixing chamber 600 is swung away from upper portion 622 (see FIG. 13) to replace the orifice plate 608 with a plate having a different size orifice as is often necessary when switching to different size abrasive, the spring 620 forces the ball 614 downwardly against flange 624 to seal off the flange opening within the flange 624 to prevent further passage of abrasive from supply tank 52.

Figure 14:
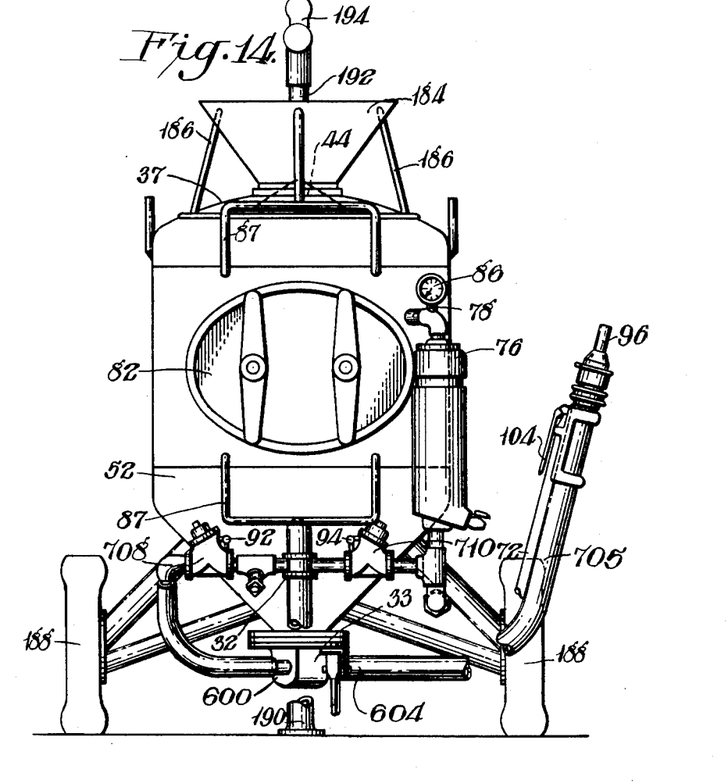
FIG. 14 shows the venting type mixing chamber incorporated with the abrasive feed tank with the air feed and air pressure control system.

In FIG. 14 there is illustrated a portable device having wheels 188, a supporting foot 190 together with a tow bar 192 and hitch 194. Also shown is an attached funnel 184 having supports 186.

The air flow control and air pressure control system for the valve arrangement of FIGS. 12–14 will now be described.

When blasting (FIG. 15) the manual air supply valve 700 is open and the manual choke relief valve 702 is open. The remote control valve 704 is closed.

The control hose 705 up to 300 feet long, and remote control valve 704 operate at 15–20 p.s.i.g. pressure. The control pressure on valves is full line pressure (80–100 p.s.i.g.) for fast reliable operation. Pressure differential is possible because of unique use of pressure reducing valve 706.

Normally closed blast air supply valve 708 is held open as is normally closed tank air supply valve 710. Blast air flows through the mixing chamber to the blast hose. Tank air flows to the tank putting it under pressure and air and abrasive then flows through the mixing chamber to the blast hose.

Because this design vents tank pressure everytime blasting is stopped, it is very important that the tank pressure be reduced to zero as fast as possible when stopping and returned to full line pressure as fast as possible when starting blast. This is accomplished by using pilot control valve 712 in conjunction with pressure reducing valve 706. Pressure reducing valve 706 reduces control line pressure to 15 p.s.i.g. so that it comes up to operating pressure almost instantaneously. As soon as control line pressure reaches 15 p.s.i.g., the high pressure line reaches 80 p.s.i.g. and opens pilot pressure air on the pilot sections of valves 708, 710 and 718. By not using restricted flow, high pressure control air through the restrictor (made possible by pilot control valve 712), main air supply valves are instantaneously operated with complete authority.

When not blasting (FIG. 16), air supply valve 700 is closed, choke relief valve is open, and remote control valve 704 is open. Opening remote control valve 704 almost instantaneously brings the 15 p.s.i.g. low pressure control air to zero which brings 80 p.s.i.g. high pressure control air to zero simultaneously because the control hose flows a considerably larger quantity of air than the restrictor allows in the circuit. The design of pressure regulator prevents interference with control hose vent action.

As soon as control circuit pressure reduces to zero, pilot control valve 712 reverses and immediately vents control suction of valves 708, 710 and 718 to exhaust. Pilot control valve 712 eliminates the necessity of exhausting main air control valves through the control system, which provides a considerable increase in their speed of operation. Normally closed valves 708 and 710 immediately close, cutting off supply air pressure and normally opened valve 718 immediately opens, venting the tank to exhaust and reducing its pressure, very rapidly, to atmosphere.

If metering orifice of mixing chamber becomes choked by large particles, choke relief valve 702 is momentarily closed (manually) to shut off blast air. This removes pressure under orifice plate 608 (FIGS. 12 and 13), but retains full tank pressure to "blow" obstruction through orifice and out blast hose. Re-opening valve 702 restores blast air.

Remote controls can be de-activated by opening manual safety valve 720 at tank.

Since it is obvious that many changes and modifications can be made in the above-described details without departing from the nature and spirit of the invention, it is to be understood that the invention is not to be limited to said details except as set forth in the appended claims.

What is claimed is:

1. In a pressure responsive mixing assembly for feeding and controlling the flow of a stream of particles comprising a particle supply container, a mixing chamber for receiving said particles flowing from said supply container, an inlet for said chamber, an outlet for said chamber, said inlet and outlet serving to pass a blast stream of pressurized air through the mixing chamber which air is mixed with the particles received by the mixing chamber, a flow conduit connecting said supply container with said mixing chamber for passing said particles from the container to said chamber, an axially slidable tube telescopically supported within said conduit through which the particles pass, a valve seat in said conduit beyond the innermost end of the tube within the conduit, an impression spring supported around said tube for urging the tube against said valve seat, pressure responsive diaphragm means holding the tube in place, and a pressure applying connection for varying the pressure acting upon the diaphragm means to lodge the tube against and away from the valve seat to close and open the flow conduit, the improvement of using a resilient shutoff valve element for opening and closing flow through said conduit, and the seating portion of said valve element being a segment of a sphere.

2. The assembly of claim 1 wherein the resilient valve element is entirely spherical in shape.

3. The assembly of claim 2 wherein the resilient valve element is loosely supported in a housing having an open bottom portion so that the spherical portion extends therethrough.

4. The assembly of claim 1 wherein the resilient valve element valve seat is semi-spherical in shape.

5. The assembly of claim 4 wherein the semi-spherical shaped valve element is supported in an open bottom housing and is maintained in place within said housing by a bolt assembly extending through said housing roof with the lower end of the bolt assembly embedded in said resilient semi-spherical valve element.

6. The assembly of claim 5 wherein said bolt assembly has an outwardly extending flange at the lower end thereof to prevent the valve element from being removed from said bolt assembly.

7. The assembly of claim 4 wherein the valve element has a central vertical passageway extending therethrough, and is supported in an opened bottom housing which has a particle flow aperture in the roof thereof in alignment with said central vertical passageway in the valve seat, said passageway being closed when said valve element is compressed and open when said compression is released.

8. A particle air mixing apparatus including a particle supply tank having a particle discharge outlet at the bottom thereof, a propellant fluid conduit below said opening, a passageway in said conduit which communicates with the tank outlet, pivotal mounting means connecting said conduit to said tank for pivoting the conduit toward and away from said tank, locking structure on said conduit and tank for locking the conduit passageway against the tank outlet, replaceable metering means in said conduit passageway, a blast hose connected with one end of said propellant fluid conduit, a blast air line connected with the opposite end of said propellant fluid conduit, a normally closed blast air supply valve connected in said blast air line, an air supply manifold connected with said blast air line prior to said blast air supply valve, a tank air supply line also leading off of said manifold, a normally closed tank air supply valve connected in said tank air supply line, a remote control valve connected in another conduit leading off from the air supply manifold whereby when the remote valve is closed pressure builds up within the above lines to open the above valves to permit air to pass to the hose and tank, and a tank vent valve leading off from said tank air supply line beyond said tank air supply valve, whereby when the remote control valve is open, the tank air supply valve closed and the air supply terminated, said tank vent valve opens to vent pressurized air from tank.

9. The apparatus of claim 8 wherein the metering means is an apertured plate, a spherical resilient shut off is mounted in spring loaded manner in the tank discharge outlet, legs depend from said resilient shut off which rest upon said apertured plate whereby when said conduit and apertured plate are pivoted away from said tank, the resilient shut off is spring forced downward to jam the tank discharge outlet to cut off further abrasive flow therethrough.

References Cited in the file of this patent

UNITED STATES PATENTS

| | | |
|---|---|---|
| 791,176 | Breidster | May 30, 1905 |
| 1,625,197 | Eisenhauer | Apr. 19, 1927 |
| 1,814,616 | Boesger | July 14, 1931 |
| 2,443,148 | Rucki | June 8, 1948 |
| 2,569,952 | Ridley | Oct. 2, 1951 |
| 2,597,434 | Bishop et al. | May 20, 1952 |
| 2,753,664 | Garver | July 10, 1956 |
| 3,021,646 | Williams | Feb. 20, 1962 |
| 3,070,924 | Hastrap | Jan. 1, 1963 |
| 3,075,318 | Dilliard et al. | Jan. 29, 1963 |

FOREIGN PATENTS

| | | |
|---|---|---|
| 8255/1932 | Australia | July 5, 1933 |

UNITED STATES PATENT OFFICE
CERTIFICATE OF CORRECTION

Patent No. 3,141,264                          July 21, 1964

Ralph W. Moore

It is hereby certified that error appears in the above numbered patent requiring correction and that the said Letters Patent should read as corrected below.

Column 6, line 36, strike out "valve seat".

Signed and sealed this 24th day of November 1964.

(SEAL)
Attest:

ERNEST W. SWIDER                               EDWARD J. BRENNER
Attesting Officer                                    Commissioner of Patents